(12) United States Patent
Kroeller et al.

(10) Patent No.: US 12,228,416 B2
(45) Date of Patent: Feb. 18, 2025

(54) NAVIGATION SYSTEM

(71) Applicant: TomTom Navigation B.V., Amsterdam (NL)

(72) Inventors: Alexander Kroeller, Leipzig (DE); Johannes Micaheël van Hulst, Amsterdam (NL); Lukasz Kosma, Lodz (PL); Pierluigi Casale, Woluwe Saint Pierre (BE); Mattia Zeni, Amsterdam (NL)

(73) Assignee: TomTom Navigation B.V., Amsterdam (NL)

( * ) Notice: Subject to any disclaimer, the term of this patent is extended or adjusted under 35 U.S.C. 154(b) by 229 days.

(21) Appl. No.: 17/799,902

(22) PCT Filed: Feb. 4, 2021

(86) PCT No.: PCT/EP2021/052659
§ 371 (c)(1),
(2) Date: Aug. 15, 2022

(87) PCT Pub. No.: WO2021/156363
PCT Pub. Date: Aug. 12, 2021

(65) Prior Publication Data
US 2023/0080592 A1   Mar. 16, 2023

(30) Foreign Application Priority Data
Feb. 4, 2020   (GB) ..................... 2001468

(51) Int. Cl.
*G01C 21/34* (2006.01)
*G01C 21/36* (2006.01)

(52) U.S. Cl.
CPC ..... *G01C 21/3484* (2013.01); *G01C 21/3617* (2013.01)

(58) Field of Classification Search
CPC ........... G01C 21/3484; G01C 21/3617; G06N 3/045; G06N 3/044; G06N 3/08; G06N 3/063; G06N 20/00
(Continued)

(56) References Cited

U.S. PATENT DOCUMENTS

| | | | |
|---|---|---|---|
| 2015/0324686 A1 | 11/2015 | Julan et al. | |
| 2016/0132476 A1* | 5/2016 | Scholler | G06F 9/451 715/202 |

(Continued)

FOREIGN PATENT DOCUMENTS

| | | |
|---|---|---|
| EP | 3229152 A1 | 10/2017 |
| JP | 2009104632 A | 5/2009 |

(Continued)

OTHER PUBLICATIONS

International Search Report dated Apr. 19, 2021 for International patent application No. PCT/EP2021/052659.

*Primary Examiner* — Tyler D Paige
(74) *Attorney, Agent, or Firm* — Park, Vaughan, Fleming & Dowler LLP

(57) ABSTRACT

Disclosed herein is a technique for operating a navigation server and a plurality of navigation clients. Each of the navigation clients transmits a model data trained on a local training data set to the navigation server. The navigation client also transmits attribute data characterizing the local training data set to the navigation server. The navigation server uses the attribute data to weigh the contributions of the model data for performing a weighted aggregation into an aggregated set of model parameters for distribution to the navigation client for improving its local model data.

18 Claims, 4 Drawing Sheets

(58) Field of Classification Search
USPC .......................................................... 701/533
See application file for complete search history.

(56) References Cited

U.S. PATENT DOCUMENTS

| | | | |
|---|---|---|---|
| 2017/0293857 A1 | 10/2017 | Stajner | |
| 2018/0324154 A1* | 11/2018 | Crabtree | H04L 9/3236 |
| 2019/0050624 A1* | 2/2019 | Chai | G06N 20/00 |
| 2019/0102692 A1* | 4/2019 | Kwant | G06F 18/2411 |
| 2019/0293440 A1* | 9/2019 | Hasemann | G06N 20/00 |
| 2019/0311298 A1* | 10/2019 | Kopp | G01C 25/00 |
| 2020/0310598 A1* | 10/2020 | Colevas | G06N 20/00 |
| 2020/0378775 A1* | 12/2020 | Beaurepaire | G01C 21/3423 |
| 2021/0048303 A1* | 2/2021 | Figueredo de Santana | G01C 21/3461 |

FOREIGN PATENT DOCUMENTS

| | | | |
|---|---|---|---|
| JP | 2009210517 A | 9/2009 | |
| JP | 2011252844 A | 12/2011 | |
| JP | 2013211616 A | 10/2013 | |
| WO | 2018057302 A1 | 3/2018 | |

* cited by examiner

NAVIGATION SYSTEM

BACKGROUND OF THE INVENTION

This invention relates to navigation devices and systems, and to methods of operating the same.

Navigation devices that include GPS (Global Positioning System) signal reception and processing functionality are well known and are widely employed as vehicle navigation systems. In general terms, a modern navigation device may comprise a processor, memory (at least one of volatile and non-volatile, and commonly both), and map data stored within said memory. Such navigation devices are generally able to process GPS location data in order to determine a current location of the device.

The GPS location data can be used by the device for providing navigation functionality, or for performing other location-based services, based on the current location of the device. For example, the device may provide relevant navigation instructions (e.g. "Turn left at the next junction") in order to aid a user of the device when navigating along a route.

The GPS location data from a plurality of such navigation devices may be provided to a central server, and used, for example, for building up a picture of the traffic conditions within a road network. Such navigation history data may also be used for a range of digital mapping purposes, e.g. in order to update or build electronic maps that may then be used by such navigation devices.

However, exporting navigation data, such as routes and destinations visited by a user, from a navigation client device can create privacy concerns, since the information can be personally sensitive.

The present invention seeks to provide a new approach to processing navigation history data that enables data to be used to improve the performance of a navigation system while preserving user privacy.

SUMMARY OF THE INVENTION

From a first aspect, the invention provides a method of operating a navigation system, wherein the navigation system comprises a server and a plurality of navigation client devices, the method comprising:

- each navigation client device using a respective location sensor, over time, to collect respective navigation history data representative of locations visited by the navigation client device, and storing the navigation history data in a memory of the navigation client device;
- each navigation client device using a respective training set of the navigation history data to train a respective local machine-learning model, stored in the memory of the navigation client device, to determine a respective set of updated parameters for the local machine-learning model;
- each navigation client device transmitting, to the server, model data representative of the respective set of updated parameters;
- each navigation client device transmitting, to the server, attribute data representative of a respective value of a common property of the respective training set used to determine the set of updated parameters;
- the server receiving, from the navigation client devices, the model data and the attribute data;
- the server determining an aggregated set of parameters from the sets of updated parameters by performing a weighted aggregation in which each of the sets of updated parameters is weighted in dependence on the value of the property of the respective training set used to determine the set of updated parameters;
- the server transmitting data representative of the aggregated set of parameters to a first navigation client device of the plurality of navigation client devices; and
- the first navigation client device using the aggregated set of parameters to update the local machine-learning model stored in the memory of the first navigation client device.

From a second aspect, the invention provides a navigation system comprising a server and a plurality of navigation client devices, wherein each navigation client device comprises a respective:
- location sensor;
- memory;
- processing system; and
- communication module, and is configured to:
- use the location sensor to collect, over time, respective navigation history data representative of locations visited by the navigation client device;
- store the navigation history data in the memory;
- use a respective training set of the navigation history data to train a respective local machine-learning model, stored in the memory of the navigation client device, to determine a respective set of updated parameters for the local machine-learning model;
- transmit, to the server, model data representative of the respective set of updated parameters; and
- transmit, to the server, attribute data representative of a respective value of a common property of the respective training set used to determine the set of updated parameters, wherein the server is configured to:
- receive, from the navigation client devices, the model data and the attribute data;
- determine an aggregated set of parameters from the sets of updated parameters by performing a weighted aggregation in which each of the sets of updated parameters is weighted in dependence on the value of the property of the respective training set used to determine the set of updated parameters; and
- transmit data representative of the aggregated set of parameters to a first navigation client device of the plurality of navigation client devices, and wherein the first navigation client device is configured to use the aggregated set of parameters to update the local machine-learning model stored in the memory of the first navigation client device.

From a third aspect, the invention provides a navigation client device comprising:
- a location sensor;
- a memory; and
- a processing system; and
- a communication module, wherein the navigation client device is configured to:
- use the location sensor to collect, over time, navigation history data representative of locations visited by the navigation client device;
- store the navigation history data in the memory;
- use a training set of the navigation history data to train a local machine-learning model, stored in the memory of the navigation client device, to determine a set of updated parameters for the local machine-learning model;

transmit, to a server, model data representative of the set of updated parameters; and transmit, to the server, attribute data representative of a value of a property of the training set used to determine the set of updated parameters.

The navigation client device may be further configured to:

receive, from the server, data representative of an aggregated set of parameters; and use the aggregated set of parameters to update the local machine-learning model stored in the memory of the navigation client device.

From a fourth aspect, the invention provides a computer program product comprising instructions which, when executed by a processor of a navigation client device having a location sensor, a memory and a communication module, cause the processor to:

use the location sensor to collect, over time, navigation history data representative of locations visited by the navigation client device;

store the navigation history data in the memory;

use a training set of the navigation history data to train a local machine-learning model, stored in the memory of the navigation client device, to determine a set of updated parameters for the local machine-learning model;

control the communication module to transmit, to a server, model data representative of the set of updated parameters; and control the communication module to transmit, to the server, attribute data representative of a value of a property of the training set used to determine the set of updated parameters.

This aspect extends to a transitory or non-transitory medium bearing the computer program product.

The computer program product may further comprise instructions which cause the processor to:

use the communication module to receive, from a server, data representative of an aggregated set of parameters; and use the aggregated set of parameters to update the local machine-learning model stored in the memory of the navigation client device.

Thus it will be seen that, in accordance with the invention, a machine-learning model on a single client device can benefit from navigation history data collected by other navigation client devices in the system, without any of the client devices having to export any sensitive history data off the client device.

Moreover, the contribution of each client device to the overall model is weighted based on a property of the navigation data stored on each respective client device. This can help prevent instabilities arising in the overall model when the patterns of usage of the respective navigation client device are widely different from each other, as will typically be the case for navigation systems. For example, users generally have different travel patterns and operate in substantially different map areas (i.e. different physical locations across a country). There may be significant differences in the typical distances different navigation devices travel in individual journeys and/or the speeds at which different users travel along a given road or road type. By weighting the contributions of different devices, the potential for instability and bias can be reduced, which can help ensure the aggregated set of parameters does actually improve the navigation performance of any client devices to which the aggregated parameters are sent.

Such a federated machine-learning approach can enable the same model to be deployed to a large number of navigation client devices, which may then individually update respective local model parameters in accordance with a users personal data. These updated parameters may then be aggregated as one updated centralised model, using weightings based on a property of the local training data from each client device. This process can then be repeated at intervals, to allow on-going improvements to be made to the local models distributed across all the navigation client devices. This decentralized iterative approach can enable strong user privacy, since the updated model parameters that are transmitted to the server cannot, in general, be reversed engineered to reproduce the original training set.

The common property of each training set may relate to any attribute of the training set of navigation history data. However, in some embodiments, the common property represents the entropy or information content of the training set. It will be appreciated that this is not the same thing as simply the raw size of the training set; for instance, navigation history data consisting of twenty instances of the same route, travelled on different days, would have a much lower information content than twenty instances of twenty completely different routes, even though the raw history data may occupy a similar amount of memory in the memory of the navigation device. The respective values may thus be entropy values. Entropy may here be understood in a formal mathematical sense, e.g. as defined by Shannon, or in a more general sense. In some embodiments, the common property is a statistic of the training set, such as a statistic representative of the variance of the training set.

In some embodiments, the common property represents the size of a geographical area covered by the training set—e.g. the area of a minimal convex shape containing some or all of a set of locations contained in the navigation history data. The area may include all of the locations, or only a subset, for example those within a confidence ellipse of a predetermined value, such as 95%, when viewing the 2D locations as normally distributed data samples. The value of the common property may represent the covered area as an absolute area or as a relative area, e.g. as a proportion of a larger area, such as a predetermined map area (e.g. a country).

The location sensor may be a satellite positioning sensor, such as a GPS sensor.

The training set of navigation history data may comprise location data (e.g. coordinate data), which may be time-stamped. A location may be a destination of a trip carried out by the navigation device. A location may be a point along a route travelled by the navigation device. The training set may comprise route data.

The local machine-learning models may additionally be trained using further data, not collected from the location sensor. In some embodiments, the further data may comprise search data—e.g. encoding search terms entered by a user, or search results previously presented to a user. The attribute data transmitted by the client devices may further encode values of one or more properties of the further data. The server may additionally use these further values when weighting each of the sets of updated parameters for determining the aggregated set of parameters.

The local machine-learning model may be any suitable model, such as a convolutional neural network, a recurrent neural network (RNN), a Gated Recurrent Unit (GRU) model, a Long Short-Term Memory (LSTM) model, a Differential Neural Computer (DNC) model, a feedforward neural network, a pair-wise ranking model, or any other suitable model.

A navigation client device may train its respective local machine-learning model using any appropriate training process—e.g. using a stochastic gradient descent.

A navigation client device may use the local machine-learning model to provide a function to a user of the device.

The device may comprise an input, such as a touchscreen for receiving user input. It may comprise an output, such as a display screen, for displaying information, such as a map, to a user.

In some embodiments, the model is used to predict a destination. The device may use the model to determine a shortlist of possible destinations. It may present this list to a user (e.g. on a display screen), for the user to select a desired destination. The device may rank possible destinations by estimated likelihood of each destination being a desired destination for the user.

In some embodiments, the model is used to predict a route to a destination—e.g. in dependence on destination data received from a user, or in dependence on a destination predicted by the model or by a further local machine-learning model stored on the client device. The device may use the local machine-learning model to determine a shortlist of possible routes. It may present this list to a user, for the user to select a desired route. The device may rank possible routes by estimated likelihood of each route being a desired route for the user. Alternatively, it may determine a single route. The device may be configured to navigate a user along the selected or determined route.

In some embodiments, the model is used to predict a time of arrival at a destination. The device may present this to a user as an estimated time of arrival, e.g. before commencing a journey or during a journey.

In some embodiments, the model is used to predict a search result or set of search results—e.g. of a desired destination. The prediction may be based on a search query received from a user—e.g. a partial search term, such as the first few letters of a place name, or a query having multiple possible results, such as "Good restaurant in Paris". The device may use the model to provide contextualized ranking for location searches by a user. The device may rank a set of locations before displaying them to the user.

The local model may receive one or more inputs such as the current time, the current weather, or the identity of the current user, which it may use when determining a prediction.

The server may transmit the aggregated set of parameters to one or more further navigation client devices of the plurality of navigation client devices. It may transmit, or attempt to transmit, the aggregated set of parameters to every navigation client device in the system.

The first navigation client device, and any other client device that receives the aggregated set of parameters, may use the aggregated set of parameters to update its respective local machine-learning model by replacing a set of stored parameters for the local machine-learning model (e.g. the updated parameters that it transmitted to the server) with the received aggregated set of parameters.

Each client device may be configured to transmit updated parameters and associated property values to the server at intervals, which may be regular or irregular (e.g. depending on when the device is powered on and has network connectivity). The client devices may train their local models on an on-going basis, or at intervals—e.g. once more than a threshold quantity of new navigation history data has been collected.

A client device may train its local model using all of the stored navigation history data. However, in some embodiments, a client device is configured to filter the stored navigation history data to select a training set that satisfies one or more selection criteria. It may, for instance, exclude a certain type of data, or it may exclude data associated with an excluded destination such as a home location or a work location. This may further enhance user privacy.

The server may be configured to calculate a succession of aggregated sets of parameters over time—e.g. at regular intervals, or in response to receiving updated parameters from a client device. It may transmit, or attempt to transmit, each aggregated set of parameters in the succession to the first navigation client device and/or to further client devices in the system.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
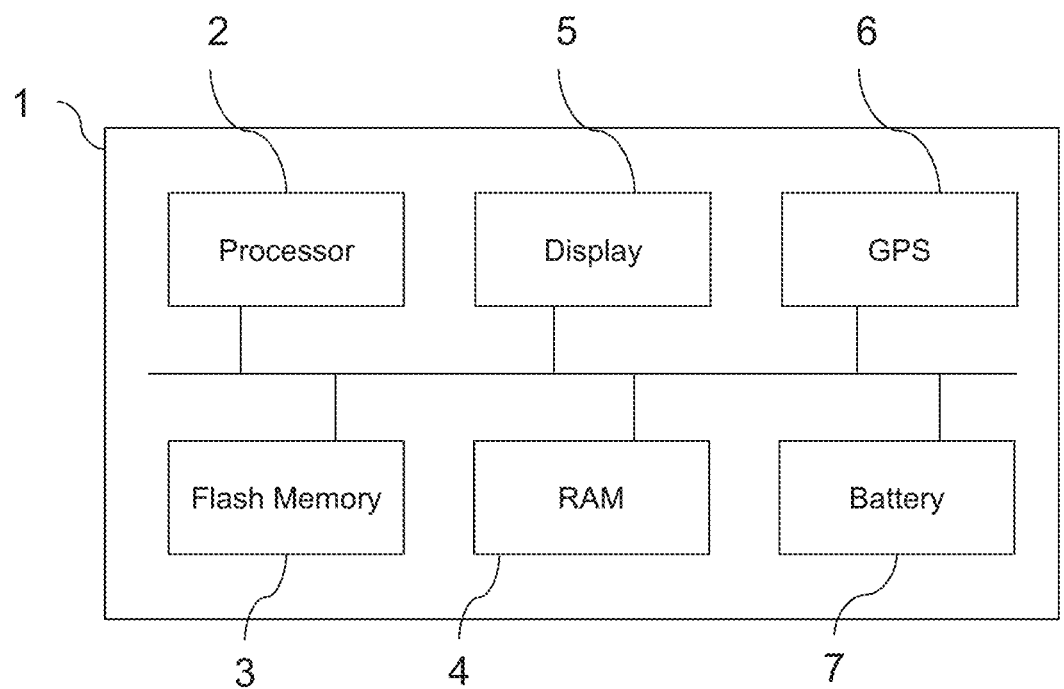
FIG. 1 is a schematic diagram of a client navigation device embodying the invention.

FIG. 1 shows key elements of a client navigation device 1 embodying the invention.

The navigation device 1 includes, among other components, a processor 2, non-volatile flash memory 3 which stores software for execution by the processor 2, volatile RAM 4 for storing temporary data, a display screen 5, a GPS module 6 and a battery 7.

The flash memory 3 stores a navigation client software program for execution by the processor 2. The navigation client program can receive location data from the GPS module 6 and use this to display a visual representation of the current location of the device 1 on an electronic map displayed on the display screen 5.

There are a wide range of computing devices which may execute such navigation client software.

Figure 2:
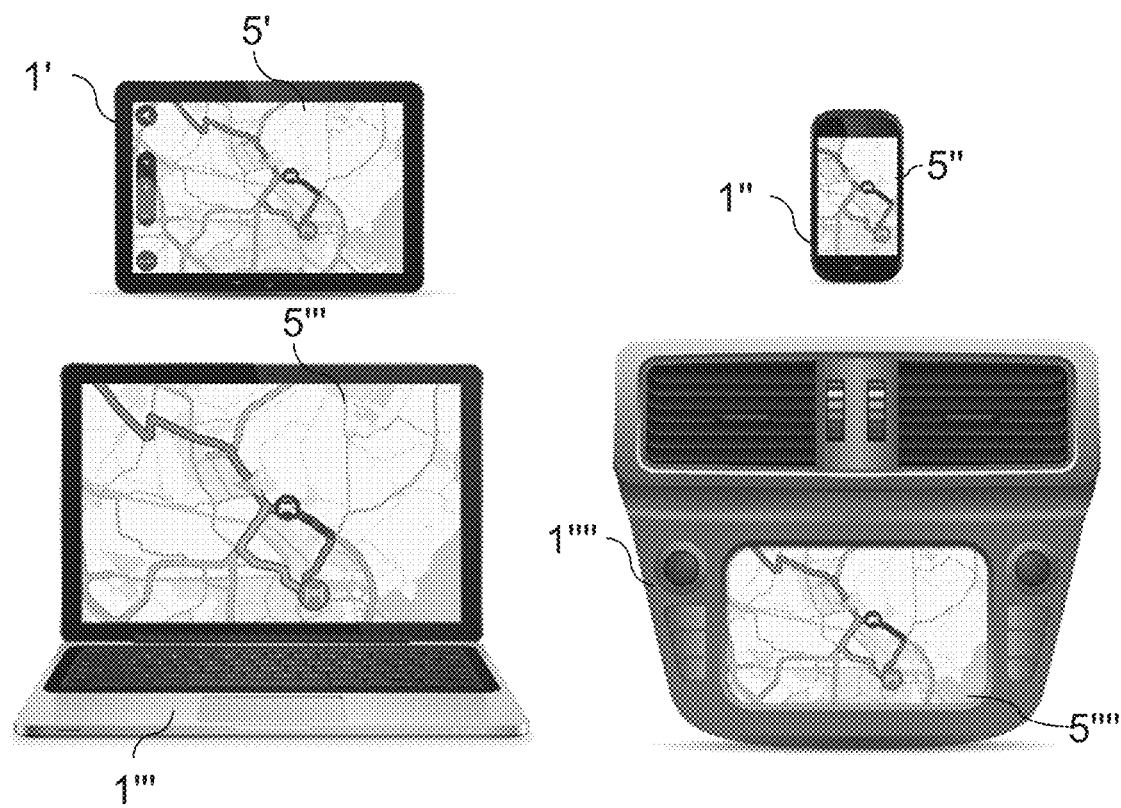
FIG. 2 is a set of variant client navigation devices, all embodying the invention, having different form factors.

FIG. 2 shows a few examples, including a tablet device 1', a smartphone 1", a laptop computer 1''', and a built-in in-car navigation system 1'''' which could be a complex infotainment system. Each has a display screen 5', 5", 5''', 5'''' for displaying navigation data, such a map, to a user. This can assist the user to navigate to a desired destination.

However, a visual display is not essential; e.g., some embodiments may provide only acoustic output, such as voiced navigation instructions.

A personal navigation device (PND) is single-purpose computing device. Vehicles also have integrated computing devices with a navigation client. Other computing devices are general purpose computing devices such as mobile phones, tablets, and wearables (watches). Any of these devices may be used to implement embodiments of the invention.

Figure 3:
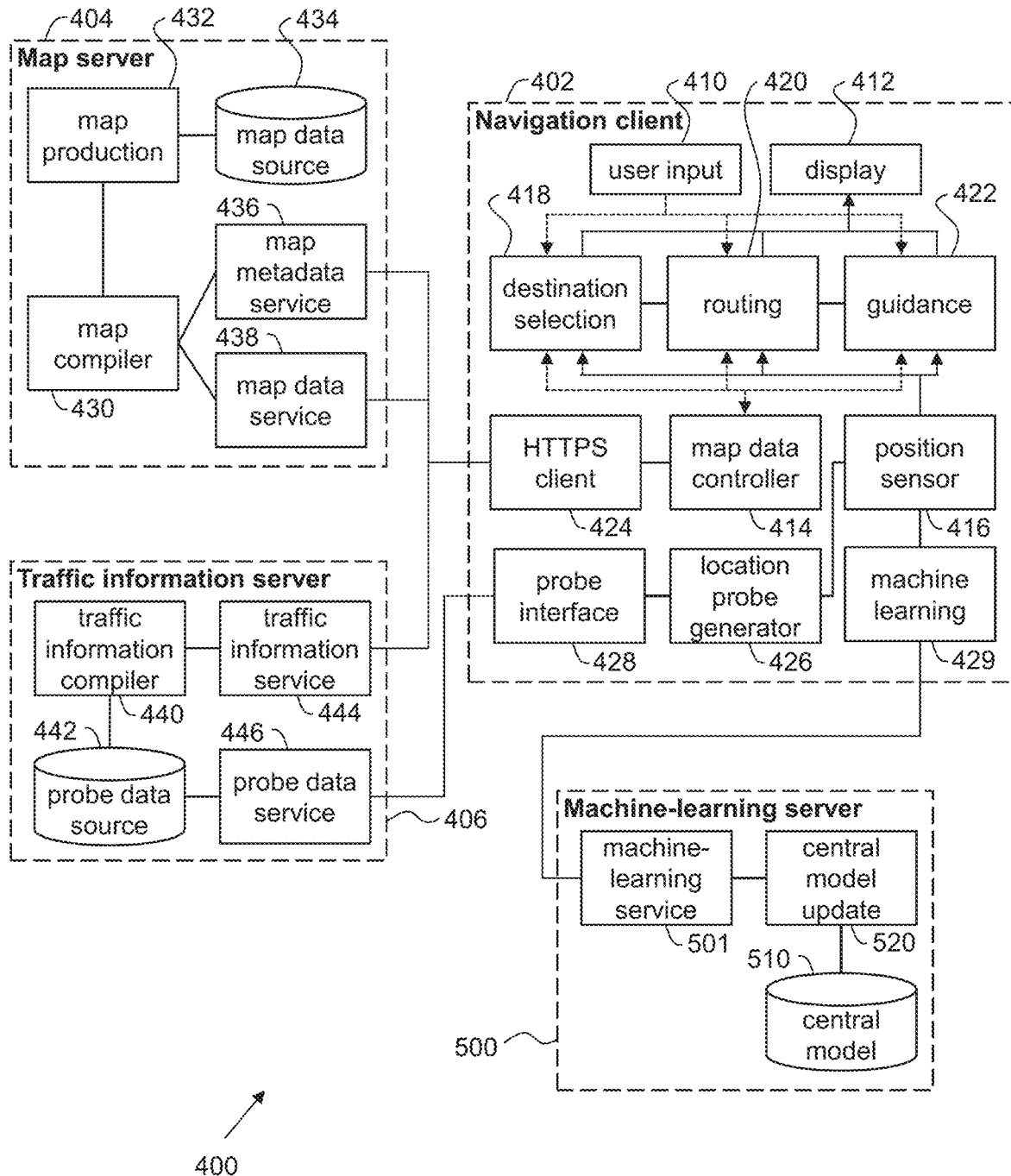
FIG. 3 is a schematic diagram of a navigation system embodying the invention.

FIG. 3 provides a functional diagram of a navigation system 400 embodying the invention.

The system 400 includes a navigation client device 402, a map server 404, a traffic information server 406, and a machine-learning (ML) server 500. These servers 404, 406, 500 and the client device 402 with their modules are described in more detail below.

The navigation client device 402 may be a device 1 as in FIG. 1, although this is not essential. Its functions may be implemented using software executing on the processor 2 of the client navigation device 1.

The system 400 will typically include many other navigation client devices (not shown in FIG. 3), each similar to this navigation client 402. These may be implemented across a range of hardware platforms, e.g. as exemplified in FIG. 2.

The navigation client 402 communicates wirelessly with the map server 404, traffic information server 406 and ML server 500. More particularly, an HTTPS client 424 on the navigation client 402 can access a map data service 438 on the map server 404 and a traffic information service 444 on the traffic information server 406. A probe interface 428 on the navigation client 402 can communicate with a probe data service 446 on the traffic information server 406. A machine-learning (ML) client module 429 on the navigation client 402 can communicate with a machine-learning service 450 on the ML server 500. These communications may occur over a cellular telephone link and/or Bluetooth™ or WiFi™ and/or any other suitable data channel.

The map server 404, traffic information server 406 and ML server 500 may be separate servers, or they may be at least partly combined in a single server system. The servers 404, 406, 500 may be individual physical servers, or they may be distributed servers, each being physically located across multiple locations, to provide load balancing or improve the speed of access for navigation client devices.

Navigation Client 402

The navigation client device 402 in FIG. 3 contains user-input devices 410 and output devices (e.g. a display screen 412) common to most computing devices. A map data controller 414 obtains and stores map data in the non-volatile memory (e.g. flash memory 3) of the computing device (e.g. the client navigation device 1). A position sensor 416 (e.g. the GPS module 6) comprises a location sensor (e.g. a GPS receiver), in addition to the conventional computing hardware components such as a processing unit, a memory, a display, a long term storage (flash memory), and a networking interface.

The navigation client 402 operates using an electronic map of an geographic area. The map information may be stored locally long-term on the device (e.g. in non-volatile, solid state memory) or may be retrieved, e.g. in pieces, as required from a map server 404. The navigation client 402 uses the electronic map to generate a map view of a geographic area of interest on the display 412. Usually, the geographic area is centred around a current location of the client device executing the navigation client software application. The current location is determined based on the position sensor 416, using known location sensing technologies such as satellite positioning (GPS, GNSS, etc.), WiFi™, mobile phone tracking, Bluetooth™ beacons, image analysis (e.g. RoadDNA™ from TomTom™, as described in PCT/EP2016/068593, PCT/EP2016/068594, PCT/EP2016/068595, and PCT/IB2016/001198), map matching, dead reckoning, and other location sensors. In the presence of location-sensing errors, the process known as "map matching" may be used to adjust the measured location(s) to best match a road segment on a map.

The navigation client 402 can assist a human user with navigating from the current location to a destination location. The destination can be entered using a destination selection module 418. The module 418 may provide a search interface which allows a user to search for a desired destination by name (e.g. "London") or other query (e.g. "Fish & chips near me"). It may provide an autocomplete function which suggests likely search terms from an incomplete search term—e.g. suggesting "London", "Loughborough", etc. in a list when the user types the letter "L" and "O". The navigation client may use an ordering process to order the search suggestions and/or search results, e.g. in order of likelihood. The ordering process may use a machine-learning model, as described in more detail below, which may be trained on the user's search history and navigation data. It may also take account of other users' search history and navigation patterns, using a federated learning approach as disclosed herein.

A routing module 420 of the navigation client 402 calculates a route to the selected destination. The routing module 420 can obtain current traffic information from the traffic information server 406, in addition to accessing the electronic map via the map data controller 414, to determine an estimated travel time or an estimated time of arrival. The current traffic information describes the current situation on the road network in the geographic area of the electronic map. This includes current average speed, current traffic density, current road closures and so on.

The routing module 420 may determine a travel time or time of arrival estimate using a machine-learning model, which may be trained with data such as the user's typical driving speeds on different roads or road types. The model may also take account of other users' driving data, using a federated learning approach as disclosed herein.

The routing module 420 may present a preferred route, as well as alternative routes, enabling the user to select a preferred route.

A guidance module 422 of the navigation client 402 uses the selected preferred route to guide the end-user to the selected destination. It may use the display 412 to show the map and a part of the route to the destination. The guidance also may take the form of additional graphical indications on the display 412. Most navigation clients 402 also support audio guidance with turn by turn instructions.

Active navigation clients 402 use the position sensor 416 to generate location probes, using a location probe generator 426, and provide these to the traffic information server 406. The communication occurs via a probe interface 428 on the client 402, which communicates with a probe data service 446 on the traffic information server 406.

Map Server 404

The map server 404 provides an infrastructure for storing, managing and creating a large amount information for creating electronic maps and the use of the electronic maps for navigation.

The map server 404 manages map information associated with $10^7$-$10^8$ kilometre of road networks for a wide range of countries (around two-hundred countries). The map information needs to be of high quality, so the server infrastructure 404 processes updates to the map information, with an update rate averaging around 1,000 updates per second. In addition, the map information is distributed to a global infrastructure of navigation clients 402. The distribution requires a sophisticated content distribution network (not shown) in addition to cloud computing systems to generate the map information to be distributed. The map server 404 may thus be distributed over multiple physical locations.

A map data source 434 feeds data to a map production module 432, from where it is passed to a map compiler 430. This is a back-office application that uses information to compile map information into an appropriate format, e.g. one complying with a standardized map specification (NDS, OSM, etc.), or to generate map information for a specific application (car navigation, on-foot navigation, vehicle type specific navigation, public transport navigation, autonomous vehicle navigation, etc.). Map compilers take relevant information from one presentation format and generate map information relevant to a specific map area.

The compiled map data is made available to remote navigation clients 402 through a map data server 438 and an associated map metadata service 436. A navigation client 402 may obtain updates only occasionally (e.g. as a single large download over a wired Internet connection), or in near real-time as required (e.g. wirelessly downloading smaller map units or tiles, depending on a current location of the client 402).

Traffic Information Server 406

The traffic information server 406 uses a traffic information compiler 440 to provide road & traffic information to navigation clients 402, through the traffic information service 444. The server 406 also receives probes from the navigation clients 402 and uses these probes to calculate, update and provide the real-time traffic information.

The traffic information server 406 aggregates location probes from a navigation client 402 into a sequence of location probes that describe the path travelled from a start location to a destination. Such timed location data is sensitive personal data. The handling of such data is subject of legal regulations such as the General Data Protection Regulation in Europe. TomTom™ patent EP3095226 discloses mechanisms for addressing privacy concerns when handling real-time probe data which may be used in the present system 400. It describes a solution that removes the device identifier value (identifying a user) from all probes in a trace when the trace data is moved from a "live trace" database to a "historic trace" database. The probes are stored in a probe data source 442.

Map information usually contains static traffic information based on historic data. For more dynamic traffic information such as traffic densities, parking availability, accidents, road closures, updated road signs, points of interest, the traffic information server 406 uses the location probes data from the navigation clients 402. The traffic information compiler 440 may use the current location probe data to provide current traffic information.

Machine-learning Server 500

The ML server 500 provides a machine-learning service 501 to navigation clients 402. The ML server 500 includes a model update engine 520, which aggregates data received from multiple navigation clients 402, and controls the transmitting of model data out to navigation clients 402. The model update module 520 accesses a central model 510 which is stored in memory on the server 500.

Figure 4:
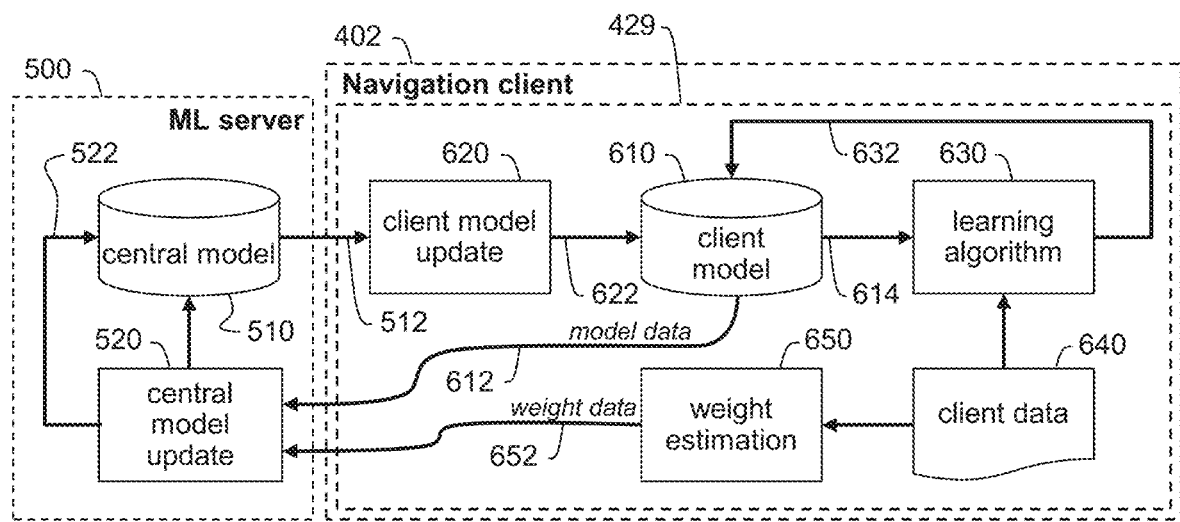
FIG. 4 is a schematic diagram showing more details of components and data flows within and between a machine-learning server and a machine-learning client module of the navigation system.

FIG. 4 provides more details of the ML server 500 and of the ML client module 429.

The machine-learning server 500 and the client modules 429 of a plurality of navigation client devices 402 together implement a federated machine-learning system in which each client device 402 independently updates a local machine-learning model obtained from a centralised server 500, using local data, and returns an updated model to the centralised server 500. The ML server 500 then merges the received updated models and provides update model data to the navigation clients 402. This client update cycle repeats over time.

This approach avoids the need for a central data repository containing sensitive user data, such as navigation and location histories, providing protection against data leaks and improving user privacy.

The ML server 500 and client modules 429 may implement federated machine-learning principles known in the art—e.g. as disclosed in WO 2018/057302A1. However, they also implement additional novel processes as disclosed herein.

FIG. 4 shows the ML server 500 storing data encoding a central model 510 and a representative navigation client 402 of a plurality of navigation clients that communicate with the ML server 500. Each navigation client 402 has a private data store containing client data 640 (embodying a training set as disclosed above).

When first initialised (e.g. when a user first switches a device 402 on after purchasing it), the client 402 receives data representative of the central model 510 and uses it as a client model 610. Thereafter, each client 402 adjusts the client model 610 using its client data 640 and, at intervals, sends the updated client model 610 to the server. A central model update module 520 in the server 500 aggregates these updated client models to generate an updated model which is then stored 522 as the current central model 510. This process repeats over time, thereby improving the central model 510 with each iteration. Because the client data 640 remains stored locally, this method preserves privacy of the client data 640, yet it provides each client 402 with a client model 610 that is based on a much larger set of client data, improving the quality of the resulting client model.

Each navigation client 402 has, within its ML client module 429, a client model update module 620 that receives 512 the current central model 510 and replaces a stored client model 610 with the latest received central model 510. The client device 402 further has a learning-algorithm module 630 that uses client data 640 to determine update parameters 632 that change the local client model 610 through a local machine-learning training process. The client 402 sends data 612 representative of its updated client model 610 back to the ML server 500 at intervals. The data 612 may encode model update matrices, e.g. making use of principles disclosed in US 2018/0089587A1.

Significantly, the client 402 also sends weight data 652 (embodying the attribute data disclosed above) to the ML server 500. The client 402 contains a weight estimation module 650 that accesses the client data 640 of the client 402 for generating weight data 652. The weight data 652 describes one or more properties of the client data 640 that the learning algorithm 630 has used to train the current client model 610. It may characterise the client data 640 of the client 402.

In some embodiments, the weight data 652 comprises an entropy value that represents the information entropy of the client data—i.e. the amount of new or unexpected information contained in the client data. In other embodiments, the weight data 652 may represent a statistical variance of the client data 640. The weight data 652 may, in some embodiments, comprise a set of distribution parameters characterising the size of the local data and/or a distribution function for the client data.

In some embodiments, the weight data 652 may represent a physical or geometric extent of locations represented within the client data 640. It may, for example, represent the area (e.g. in km$^2$) of a region containing all or a predetermined proportion (e.g. 90%) of all the locations within the client data 640. The region could be defined as the smallest convex region containing all the locations, or in any other suitable way. The weight data 652 may encode an area ratio value, determined as the ratio of a commonly travelled area relative to an overall data space (e.g. a larger map area, such as a whole country). A weight value may additionally or alternatively be determined using other factors, such as road type travelled.

For example, a first navigation client 402 traveling predominantly on a single route (e.g. travel between home and work) and a second navigation client travelling on a large number of routes will have substantially different local client data 640. In some embodiments, the respective weight estimation modules 650 may characterise these differences in the weight data 652 between the two clients.

Each weight estimation module 650 may calculate a respective statistic value, for sending as a weight value (embodying a value of a common property, as described above) to the ML server 500.

The server 500 may normalise the received weight values, e.g. using the Softmax function:

$$\sigma(x)_j = \frac{e^{z_j}}{\sum_{k=1}^{K} e^{z_k}} \text{ for } j = 1, \ldots K,$$

where K is the number of navigation clients 402 in the system, indexed by j; and where $x=(z_1, \ldots, z_K) \in \mathbb{R}^K$ is the set of K latest weight values, $z_k$, received by the server 500 from the K clients 402.

This allows the server 500 to scale the weights as a probability distribution (i.e. summing to one). However, the use of Softmax is not essential; the server 500 could, for instance, simply divide each received weight value by the sum of the K latest-received weight values from across the K clients 402.

When first configuring the system 400, the coefficients (parameters) of each client model may be initialized to the same values, e.g. as described in the paper "Communication-Efficient Learning of Deep Networks from Decentralized Data" (arXiv:1602.05629). However, after further training by the local client learning algorithm 630, the client model 610 based on the client data 640, the client 402 sends the client model data 612 and the weight data 652 to the server 500.

This approach of a federated machine learning model that can operate on client data, from different navigation clients 402, having different properties and/or degrees of entropy, allows the ML server 500 to develop a stable model even when receiving local model data from navigation clients 402 that have been trained on substantially different client data 640. This is very useful in navigation systems, in which users typically vary substantially in their navigation patterns (e.g. map area covered, routes used, frequency, travel times, travel duration); for instance, most users will spend the majority of their travel time in relatively close proximity to their homes.

The use of the weight data 652 derived from client navigation history data 640 can provide fast convergence and stability of the central model 510, even when using local data that has widely varying degrees of overlap with the overall dataset, while also preserving user privacy.

The central update module 520 of the server 500 uses the weight data 652 it receives from navigation clients 402 to adjust the contribution of the associated updated client model 612 to generate the updated central model 522. The central model update module 520 performs a weighted model averaging of the client models 612, weighted in accordance with the associated weight data 652. For example, the update module 520 may give more weight to the models that have higher entropy weightings, since these models are likely to provide more "new" information.

After processing all models and weights from the clients 402, the updated central model 522 replaces the central model 510 for distribution to the clients 402. A new central model 510 may be calculated at regular intervals, or whenever updated model data 612 has been received from a threshold number of clients 402. In some embodiments, an update could be performed every time any new client model data 612 and weight data 652 are received; this would ensure the central model 510 is as current as possible, but may be less computationally efficient. After initialisation of the server 500, it may take several iterations of client updates for the central model to converge to a stable version.

The navigation client 402 typically stores client data 640 comprising one or more of: a set of visited locations, start locations, end locations, travel times, speeds of travel, map location searches, or mode of transport.

Figure 5:
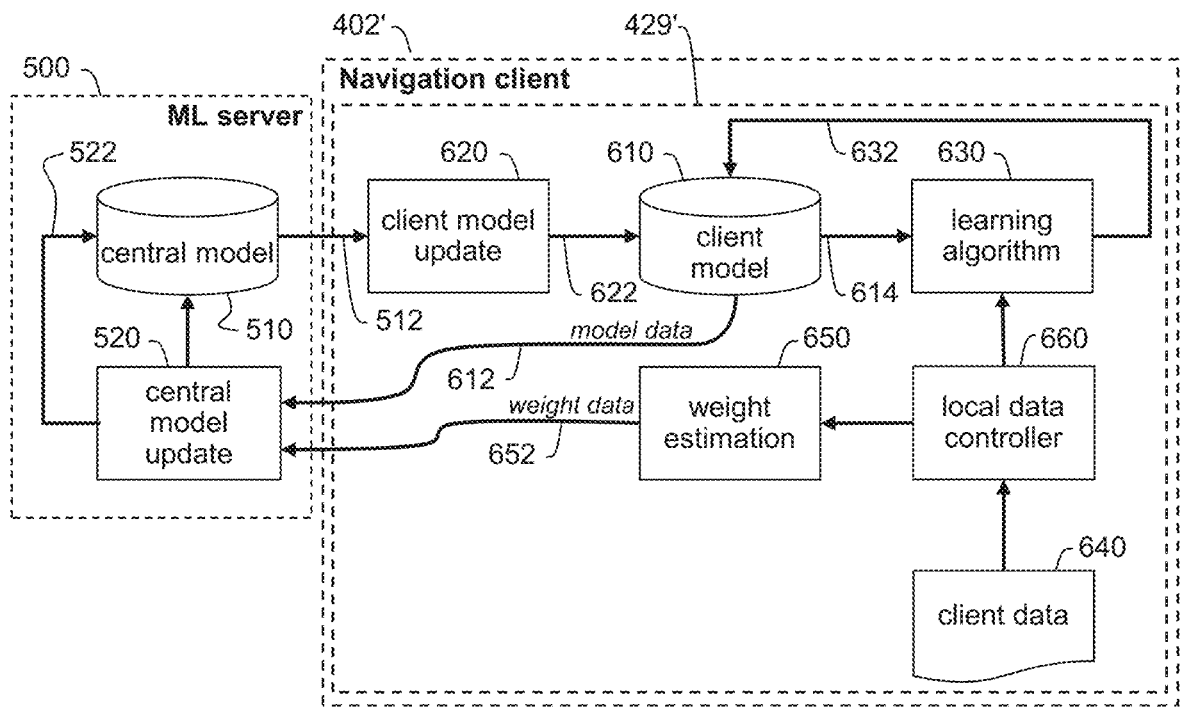
FIG. 5 is a schematic diagram showing components and data flows within and between the machine-learning server and a variant machine-learning client module in a navigation system embodying the invention.

FIG. 5 shows a variant navigation client device 402', having a variant machine-learning module 429'. The navigation client 402' in this embodiment is similar to the device shown in FIG. 4, but additionally contains a local data controller module 660 which manages the client data 640 used in the learning algorithm module 630 and the weight estimation module 650. The local data controller 660 performs filter operations on the local data 640, so that certain local data is not used in the distributed learning system—i.e. such that only some of the local data 640 forms the training set. For example, the navigation client 402' may exclude certain types of data, or may exclude data associated with destinations such as a home location or a work location from use in the distributed learning system.

In some embodiments, the clients 402, 402' may store a plurality of different client models, serving different purposes. The different machine-learnt models may have different associated learning algorithms, weight estimation modules, central models, etc. The models may be stored on different respective ML servers, or on the same ML server 500. Thus at least some of the features described in FIG. 4 may be replicated within the client 402 and on the server 500, as appropriate.

Some specific embodiments will now be given, to illustrate the wide variety of applications and use cases for ML models, developed federally by navigation systems as disclosed herein. These are not limiting, and other use cases are also possible.

Destination Prediction

In some embodiments, the central and local ML models 510, 610 are used to predict an intended destination for a journey, without the user having manually to insert the destination. This is a multi-class classification problem.

By developing a central model 510 incorporating model parameters from many different users, the local client model 610 can not only predict previously-visited locations for the particular user, but also can predict new, never-before-visited destinations that are similar to previously visited destinations, according to some properties, e.g., in the same class "supermarket".

The process takes, as input, the historic behaviour of a customer, i.e., his previous trips, in terms of:
- sequences of GPS traces (each sequence is a trip);
- sequences of map attributes from the GPS traces (e.g. one or more of: a version of the map; a number of road segments travelled; an average speed registered for road segments travelled; average turn times used; etc.);
- external databases, e.g., weather, personal calendar, etc.
- previous destinations, which may be derived from last index items in previous trips and/or from items resulting from previous search queries.

These are stored in the client data 640 and are used by the learning algorithm 630 to train the local client model 610.

The process consists of the following steps, which are repeated over time:
- when no historic data is available, the navigation device 402 receives a pre-trained centralized model 510; if this model is not available either, a random model is initialized;
- after each iteration (trip, part-of trip, search query), the local client model 610 is updated by training on the new client data 640; a map-matching process may be executed online to extract map attributes from trips/destinations;
- periodically, the local model 610 (i.e. parameter data 612) and weight data 652 are sent to the ML server 400 where an aggregating operation is performed by the model update module 520;
- periodically, the central model 510 is sent to all the individual navigation devices 402 in the system 400, which replace their respective local models 610 with the received central model 510; the makes the local models 610 more robust to context changes.

Figure 6:
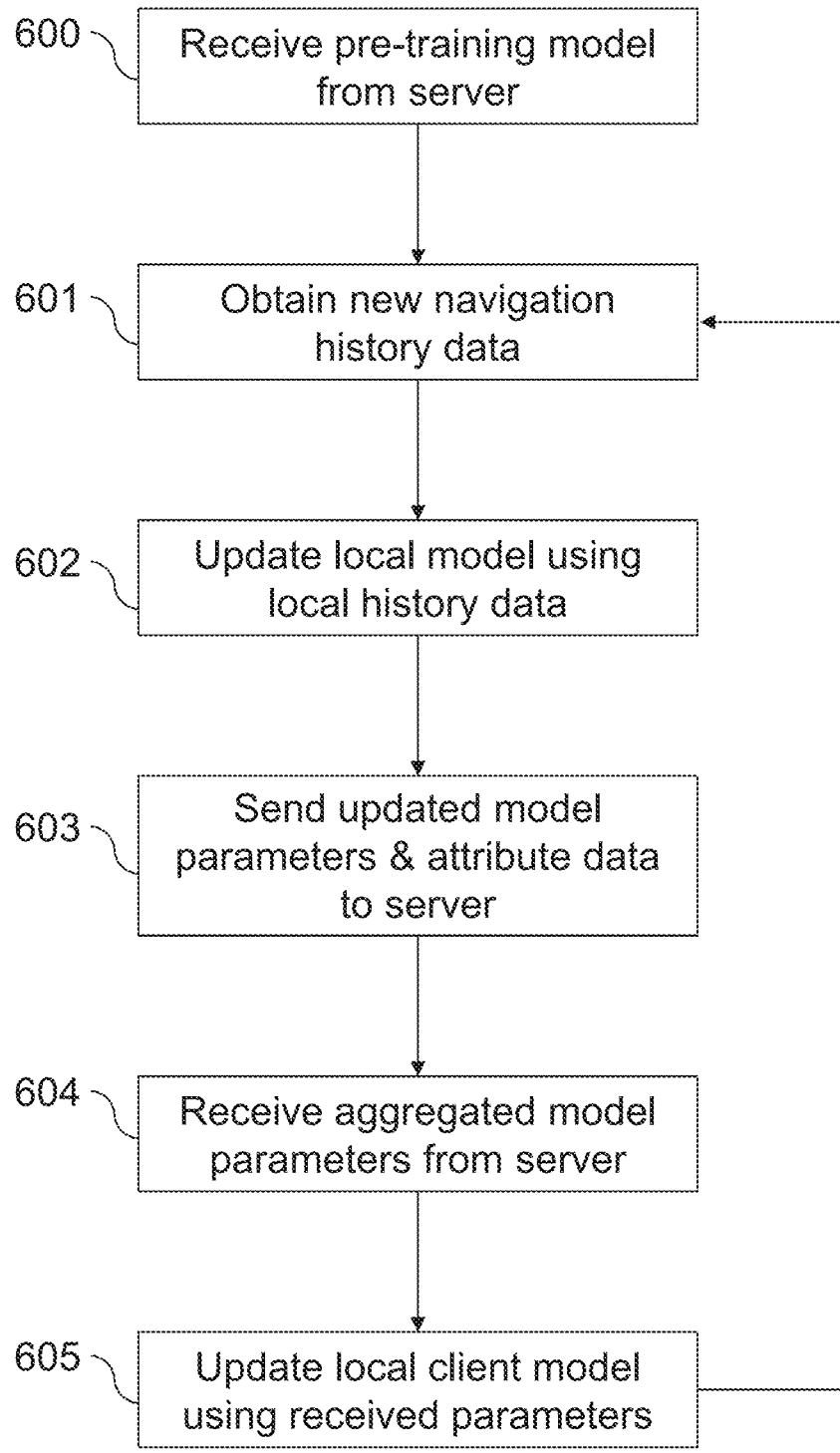
FIG. 6 is a flow chart of a federated training process used by a navigation system embodying the invention.

FIG. 6 illustrates these steps as a flow chart from the perspective of the client device 402.

In a first step 600, the client device 402 is initialised by receiving pre-training model data from the server 400.

Next 601, the user starts using the device for navigation purposes, and navigation history data starts being stored in memory. This may be stored on a rolling basis, e.g. in a fixed size buffer, or the history may be cleared every time the local model is updated.

Then 602, once a suitable quantity of data has been obtained (e.g. after every trip ends, or after every search query), the local model is re-trained to incorporate the new material (e.g. using a gradient descent method).

Then 603, after the training finishes, or at regular intervals, the updated model data 612 and attribute data (weight data 652) is sent to the server 400, which inputs the data to a weighted aggregation process to generate updated aggregated model data.

The client device 402 (along with other client devices) then receives 604 these aggregated parameters from the server, and updates 605 its local model in dependence on the received parameters.

The process repeats as new navigation data is obtained 601.

In the example use case of destination prediction, the machine-learning task performed by the learning algorithm 630 is multiclass classification, and the model is a deep learning model that deals with sequences, due to the dependency on the temporal dimension. It may be a one-dimensional convolutional neural network; a recurrent neural network (RNN), such as a Gated Recurrent Unit (GRU), Long Short-Term Memory (LSTM), or Differential Neural Computer (DNC) model; a feedforward neural network; or any other suitable model.

Route Prediction

In some embodiments, the central and local ML models 510, 610 are used to predict an optimal route for a journey, without the user having manually to select the route.

The problem can be described as the navigation system 400 predicting a route a customer, not by optimizing according to a single metric (e.g. journey time or distance), but instead based on multiple metrics for different parts of a route, e.g. based on the driving style and contextual information of the user. For instance, the system might learn the users preference that, "When I'm late to destination A, in the morning, I prefer to take highways (fastest), except for a specific highway that I always avoid and in that case I prefer to take a shorter detour".

The federated learning approach disclosed herein makes it possible to predict not only previously-used routes by the current user, but also to generalize to new routes that are similar to previously used routes according to some properties, e.g., class "highway", among others.

The process takes, as input, the historic behaviour of a customer, i.e., his previous trips, in terms of:
- sequences of GPS traces (each sequence is a trip);
- sequences of map attributes from the GPS traces;
- external databases, e.g., weather, personal calendar, etc.

These are stored in the client data 640 and are used by the learning algorithm 630 to train the local client model 610.

The ML model in this case is a deep-learning model that deals with sequences, due to the dependency on the temporal dimension. Additionally, due to the nature of the problem and the huge number of classes to be predicted, the best suited model may be a recurrent neural network.

The federated learning process may be the same or similar to that set out above for destination prediction.

Arrival Time Prediction

In some embodiments, the central and local ML models 510, 610 are used to predict the estimated time of arrival (ETA) of a user on a trip, taking into account her personal driving style, without sharing sensitive information belonging to the user.

The federated learning approach makes it possible to predict the ETA for the user on routes she has used previously used, but it can also generalize to new routes.

The process takes, as input, the historic behaviour of a customer, i.e., his previous trips, in terms of:
- sequences of GPS traces (each sequence is a trip);
- sequences of map attributes from the GPS traces;
- external databases, e.g., weather, personal calendar, etc.

These are stored in the client data 640 and are used by the learning algorithm 630 to train the local client model 610.

The ML problem in this example may be considered as a regression problem or as a multiclass classification problem.

For a multiclass classification model, ETAs need to be predefined (e.g. 1, 5, 10, 15, 30 min), and the task will then involve predicting one of the predefined classes. For a regression task, the exact arrival time would be inferred, meaning this approach would attempt to predict the exact arrival time.

The federated learning process may be the same or similar to that set out above for destination prediction.

Ranking Search Results

In some embodiments, the central and local ML models 510, 610 are used to provide contextualized ranking for location searches by a user. The search process occurs locally and/or remotely (e.g. involving communication with the map server 404), and, once the results are generated, the process ranks the locations before displaying them to the customer.

The ranking will be based on the personal preferences of the user (e.g. his search history), but will also benefit from previous searches performed by other users, e.g. in the same locality, due to the federated learning.

The process takes, as input, the historic behaviour of a customer, i.e., his previous trips, in terms of:
 previously visited destinations (e.g. obtained from GPS traces);
 previous search data (e.g. query logs).

These are stored in the client data 640 and are used by the learning algorithm 630 to train the local client model 610.

The ML problem in this example is a form of machine-learning based ranking (MLR). The ML model used by the learning algorithm 630 may be a pair-wise ranking model. The model attempts to predict, given a pair of possible results (s1, s2), which of the following better suits the information need of the customer's user query.

The federated learning process may be the same or similar to that set out above for destination prediction.

Further General Details

In general, in any embodiments disclosed herein, system and apparatus which may be used to implement the processes disclosed herein may include a smart phone, a cell phone, a portable personal computer (PC), a Personal Digital Assistant (PDA), a dedicated Portable Navigation Device (PND), a vehicle such as an automobile, or any type of processing device that is configured to execute navigation software in a portable manner so as to provide route planning and navigation functionality.

Some embodiments have been described with reference to road segments. It should be realised that the invention may also be applicable to other navigable segments, such as segments of a path, river, canal, cycle path, tow path, railway line, or the like. For ease of reference these are commonly referred to herein as a road segment.

It will also be apparent that where route planning is performed in some embodiments of the invention, this may occur even in circumstances where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Embodiments may use the Global Positioning System (GPS)—e.g. when not out of range in a tunnel or covered parking area. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location, as GPS data, to any number of receiving units. However, it will be understood that other Global Positioning systems could be used, such as GLOSNASS, the European Galileo positioning system, COMPASS positioning system or IRNSS (Indian Regional Navigational Satellite System).

The GPS system is implemented when a device 1, specially equipped to receive GPS data, begins scanning radio frequencies for GPS satellite signals. Upon receiving a radio signal from a GPS satellite, the device 1 determines the precise location of that satellite via one of a plurality of different conventional methods. The device 1 will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device 1 to calculate its three dimensional position by the same geometrical calculation in a known manner. The position and velocity data can be updated in real time on a continuous basis by an unlimited number of users.

A device 1 embodying the invention may be capable of establishing a data session, if required, with network hardware of a "mobile" or telecommunications network via a mobile device, for example a mobile telephone, PDA, and/or any device with mobile telephone technology, in order to establish a digital connection, for example a digital connection via known Bluetooth™ technology. Thereafter, through its network service provider, the mobile device can establish a network connection (through the Internet for example) with a server. As such, a "mobile" network connection can be established between the device (which can be, and often times is, mobile as it travels alone and/or in a vehicle) and the server to provide a "real-time" or at least very "up to date" gateway for information.

The establishing of a network connection between the mobile device (via a service provider) 1, 402 and another device such as the server 404, 406, 500, using the Internet for example, can be done in a known manner. In this respect, any number of appropriate data communications protocols can be employed, for example the TCP/IP layered protocol. Furthermore, the mobile device can utilize any number of communication standards such as CDMA2000, GSM, IEEE 802.11 a/b/c/g/n, etc. Hence, it can be seen that the Internet connection may be utilised, which can be achieved via data connection, via a mobile phone or mobile phone technology within the navigation device for example.

The device 1, 402 may be able to communicate with a server 404, 406, 500 via a generic communications channel that can be implemented by any of a number of different arrangements, such as a cellular-network data connection, a direct connection via personal computer via the Internet, etc. In one illustrative arrangement, the communication channel includes telephone and computer networks. Furthermore, the communication channel may be capable of accommodating wireless communication, for example, infrared communications, radio frequency communications, such as microwave frequency communications, etc. Additionally, the communication channel can accommodate satellite communication.

The communication signals transmitted through a communication channel include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), General Packet Radio Service (GPRS), etc. Both digital and analogue signals can be transmitted through the communication channel. These signals may be modulated, encrypted and/or compressed signals as may be desirable for the communication technology.

A remote server 404, 406, 500 may include, in addition to other components, a processor operatively connected to a memory and further operatively connected, via a wired or wireless connection, to a mass data storage device. The mass storage device contains a store of navigation data and map information, and can again be a separate device from the server or can be incorporated into the server. The processor is further operatively connected to a transmitter and a receiver, to transmit and receive information to and from a navigation device 1, 402 via a communication channel. The signals sent and received may include data, communication, and/or other propagated signals. The transmitter and receiver may be selected or designed according to the communications requirement and communication technology used in the communication design for the navigation system. Further, it should be noted that the functions of the transmitter and receiver may be combined into a single transceiver.

A device 1, 402 embodying the invention may comprise a processor 2 and memory 3, 4 which may cooperate to support a BIOS (Basic Input/Output System) that functions as an interface between functional hardware components of the device and the software executed by the device. The processor 2 may load an operating system from the memory 3, 4, which provides an environment in which application software (e.g. implementing route planning and navigation functionality) can run. The application software can provide an operational environment including the Graphical User Interface (GUI) that supports core functions of the device, for example map viewing, route planning, navigation functions and any other functions associated therewith. In this respect, part of the application software may comprise a view generation module.

The processor 2 of the device 1 may be programmed to receive GPS data received by an antenna and, from time to time, to store that GPS data, together with a time stamp of when the GPS data was received, within the memory to build up a record of the location of the navigation device. Each data record so-stored may be thought of as a GPS fix; i.e. it is a fix of the location of the navigation device and comprises a latitude, a longitude, a time stamp and an accuracy report.

The data may be stored substantially on a periodic basis which is for example every 5 seconds. The skilled person will appreciate that other periods would be possible and that there is a balance between data resolution and memory capacity; i.e. as the resolution of the data is increased by taking more samples, more memory is required to hold the data. However, in other embodiments, the resolution might be substantially every: 1 second, 10 seconds, 15 seconds, 20 seconds, 30 seconds, 45 seconds, 1 minute, 2.5 minutes (or indeed, any period in between these periods). Thus, within the memory of the device there is built up a record of the whereabouts of the device 200 at points in time.

In some embodiments, it may be found that the quality of the captured data reduces as the period increases and whilst the degree of degradation will at least in part be dependent upon the speed at which the device 1 was moving a period of roughly 15 seconds may provide a suitable upper limit.

Whilst the device 1 is generally arranged to build up a record of its whereabouts, some embodiments do not record data for a predetermined period and/or distance at the start or end of a journey. Such an arrangement helps to protect the privacy of the user of the device since it is likely to protect the location of his/her home and other frequented destinations. For example, the device 1 may be arranged not to store data for roughly the first 5 minutes of a journey and/or for roughly the first mile of a journey.

In other embodiments, the GPS may not be stored on a periodic basis but may be stored within the memory when a predetermined event occurs. For example, the processor may be programmed to store the GPS data when the device passes a road junction, a change of road segment, or other such event.

Further, the processor 2 may be programmed, from time to time, to upload the record of the whereabouts of the device 1, 402 (i.e. the GPS data and the time stamp, and/or location and time stamp data obtained using a light sensor or microphone as described herein) to a server 404, 406, 500. In some embodiments in which the device has a permanent, or at least generally present, communication channel connecting it to a server, the uploading of the data occurs on a periodic basis which may for example be once every 24 hours. The skilled person will appreciate that other periods are possible and may be substantially any of the following periods: 15 minutes, 30 minutes, hourly, every 2 hours, every 5 hours, every 12 hours, every 2 days, weekly, or any time in between these. Indeed, in such embodiments the processor may be arranged to upload the record of the whereabouts on a substantially real time basis, although this may inevitably mean that data is in fact transmitted from time to time with a relatively short period between the transmissions and as such may be more correctly thought of as being pseudo real time. In such pseudo real time embodiments, the device may be arranged to buffer the GPS fixes within memory and to transmit these when a predetermined number have been stored. This predetermined number may be on the order of 20, 36, 100, 200 or any number in between. The skilled person will appreciate that the predetermined number is in part governed by the size of the memory.

In other embodiments, which do not have a generally present communication channel, the processor 2 may be arranged to upload the record to a server 404, 406, 500 when a communication channel is established. This may for example, be when the device 1, 402 is connected to a user's computer, or when it emerges from a tunnel or other area with no network connectivity. Again, in such embodiments, the navigation device 1, 402 may be arranged to buffer the position fixes within memory. Should the memory become full of position fixes, the device may be arranged to deleted the oldest position fixes and as such it may be thought of as a First in First Out (FIFO) buffer.

In some embodiments, a record of the whereabouts of the device 1, 402 may comprise one or more traces with each trace representing the movement of the device, e.g. within a 24 hour period. Each period may be arranged to coincide with a calendar day but in other embodiments, this need not be the case. Generally, a user of a device gives his/her consent for the record of the device's whereabouts to be uploaded to the server. If no consent is given then, in some embodiments, no record is uploaded to the server. The device 1, 402 itself, and/or a computer to which the device is connected, may be arranged to ask the user for his/her consent to such use of the record of whereabouts. A remote server 404, 406, 500 may be arranged to receive the record of the whereabouts of the device and to store this within a mass data storage for processing.

It will be appreciated by those skilled in the art that the invention has been illustrated by describing various specific embodiments thereof, but is not limited to these embodiments; many variations and modifications are possible, within the scope of the accompanying claims.

What is claimed is:

1. A navigation system comprising a server and a plurality of navigation client devices, wherein:
   each navigation client device among the plurality of navigation client devices is configured to:
      collect respective navigation history data representative of locations visited by the navigation client device;
      use a respective training set of the respective navigation history data to train a respective local machine-learning model, the training including determining a respective set of updated parameters for the respective local machine-learning model, the parameters including coefficients of the respective local machine learning model; and
      transmit, to the server, the respective set of updated parameters and
      attribute data representative of at least one property of the respective training set;
   the server is configured to:
      receive, from each of the navigation client devices, the respective set of updated parameters and corresponding attribute data;
      generate an aggregated set of parameters based on the respective sets of updated parameters, the generating including performing a weighted aggregation for which each of the respective sets of updated parameters is weighted in dependence on the corresponding attribute data; and
      transmit data representative of the aggregated set of parameters to a first navigation client device among the plurality of navigation client devices; and the first navigation client device is configured to:
      generate an updated respective local machine learning model, the generating including replacing parameters of the respective local machine-learning model with parameters from the aggregated set of parameters; and
      provide, to a user, one or more outputs of the updated respective local machine learning model, the outputs being generated by processing data in the updated respective local machine learning model.

2. The navigation system of claim 1, wherein the at least one property includes at least one of:
   an entropy that indicates an amount of new or unexpected information in the respective training set; and
   a variance among the respective navigation history data in the respective training set.

3. The navigation system of claim 1, wherein the at least one property includes:
   a size of a geographical area covered by the respective training set.

4. The navigation system of claim 1, wherein each navigation client device is configured to use the respective local machine-learning model to at least one of:
   determine a shortlist of possible destinations;
   predict a route to a destination;
   predict a time of arrival at a destination; and
   predict one or more search results based on a search query received from a user.

5. The navigation system of claim 1, wherein the server is configured to transmit the data representative of the aggregated set of parameters to, in addition to the first navigation client device, one or more other navigation client devices.

6. A navigation client device, comprising:
   a location sensor; and
   a processing system;
   wherein the navigation client device is configured to:
      collect navigation history data representative of locations visited by the navigation client device;
      use a training set of the navigation history data to train a local machine-learning model, the training including determining a set of updated parameters for the local machine-learning model, the parameters including coefficients of the local machine learning model;
      transmit, to a server, the set of updated parameters and attribute data representative of at least one property of the training set;
      receive, from the server, data representative of an aggregated set of parameters;
      generate an updated local machine learning model, the generating including replacing the parameters of the local machine-learning model with parameters from the aggregated set of parameters; and
      provide, to a user, one or more outputs of the updated local machine learning model, the outputs being generated by processing data in the updated local machine learning model.

7. The navigation client device of claim 6, wherein the at least one property includes at least one of:
   an entropy that indicates an amount of new or unexpected information in the training set; and
   a variance among the navigation history data in the training set.

8. The navigation client device of claim 6, wherein the at least one property includes:
   a size of a geographical area covered by the training set.

9. The navigation client device of claim 6, wherein the navigation client device is configured to:
   use search data, in addition to the training set of the navigation history data, to train the local machine-learning model.

10. The navigation client device of claim 6, wherein, when providing the one or more outputs of the updated local machine learning model, the navigation client device is configured to:
    use the local machine-learning model to determine a shortlist of possible destinations; and
    present, to the user, the shortlist of possible destinations.

11. The navigation client device of claim 6, wherein, when providing the one or more outputs of the updated local machine learning model, the navigation client device is configured to:
    use the local machine-learning model to predict a route to a destination and/or to predict a time of arrival at a destination; and
    present, to the user, the route to the destination and/or the time of arrival at the destination.

12. The navigation client device of claim 6, wherein, when providing the one or more outputs of the updated local machine learning model, the navigation client device is configured to:
- use the local machine-learning model to predict one or more search results based on a search query received from the user; and
- present, to the user, the one or more search results.

13. The navigation client device of claim 6, wherein, when providing the one or more outputs of the updated local machine learning model, the navigation client device is configured to:
- use the model to predict an output based on input data, wherein the input data is representative of one or more of: time, weather, and an identity of the user; and
- present, to the user, the output.

14. The navigation client device of claim 6, wherein the navigation client device is configured to:
- select the training set of the navigation history data from among the navigation history data based on one or more selection criteria.

15. A non-transitory computer readable storage medium storing instructions which, when executed by a processor of a navigation client device, cause the processor to:
- collect navigation history data representative of locations visited by the navigation client device;
- use a training set of the navigation history data to train a local machine-learning model, the training including determining a set of updated parameters for the local machine-learning model, the parameters including coefficients of the local machine learning model;
- transmit, to a server, the set of updated parameters and attribute data representative of at least one property of the training set;
- receive, from the server, data representative of an aggregated set of parameters;
- generate an updated local machine learning model, the generating including replacing parameters of the local machine-learning model with parameters from the aggregated set of parameters; and
- provide, to a user, one or more outputs of the updated local machine learning model, the outputs being generated by processing data in the updated local machine learning model.

16. The non-transitory computer readable storage medium of claim 15, further comprising instructions which, when executed by the processor, cause the processor to:
- use the communication module to receive, from a server, data representative of an aggregated set of parameters; and
- use the aggregated set of parameters to update the local machine-learning model stored in the memory of the navigation client device.

17. The non-transitory computer readable storage medium of claim 15, wherein the at least one property includes at least one of:
- an entropy that indicates an amount of new or unexpected information in the training set; and
- a variance among the navigation history data in the training set.

18. The non-transitory computer readable storage medium of claim 15, wherein the at least one property includes:
- a size of a geographical area covered by the training set.

* * * * *